July 24, 1928.  1,678,548
F. R. BELLUCHE
MECHANICAL MOVEMENT
Filed Aug. 31, 1923   3 Sheets-Sheet 2

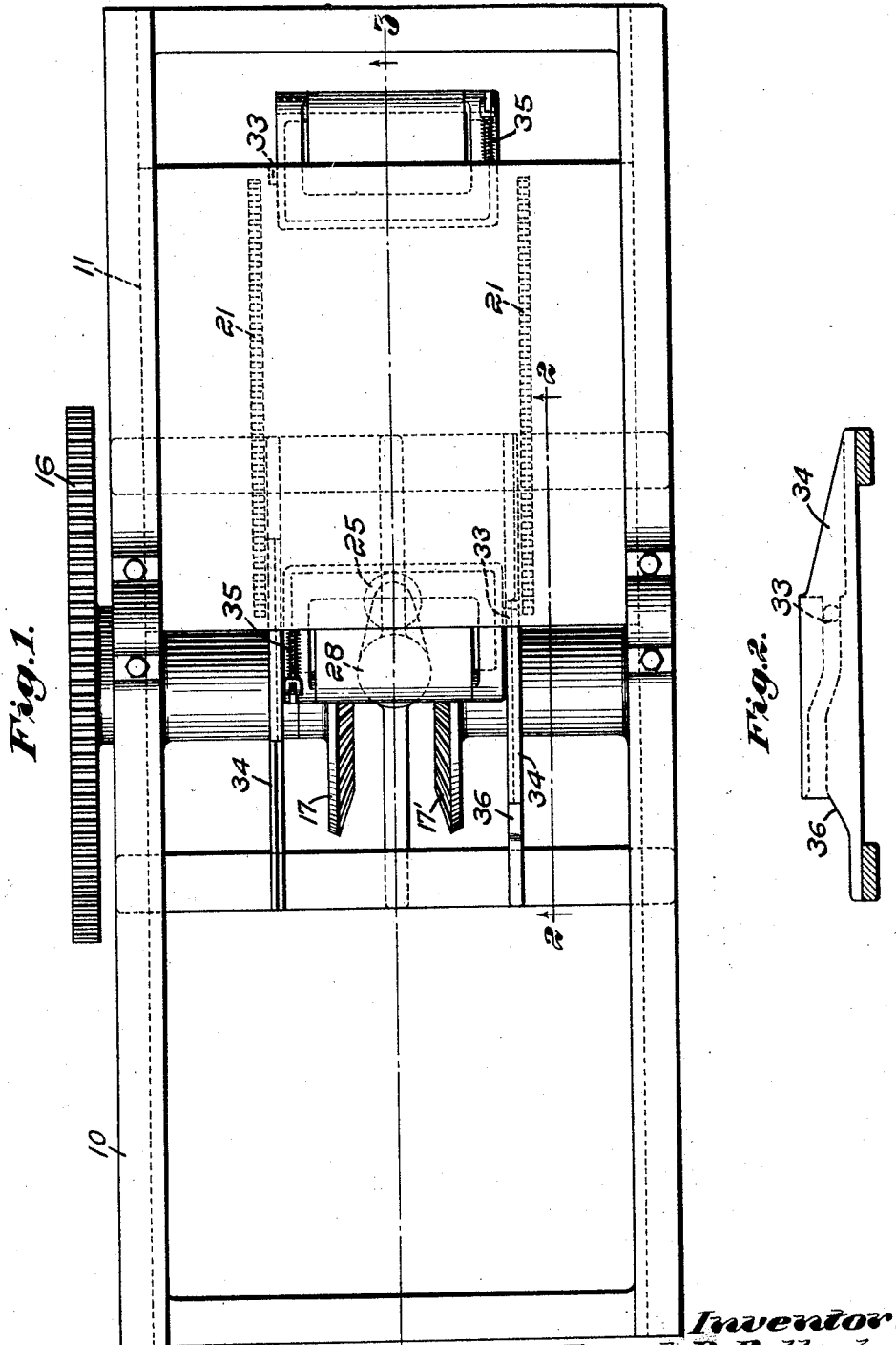

Inventor:
Frank R. Belluche,
by Emery, Booth, Janney & Varney. Attys.

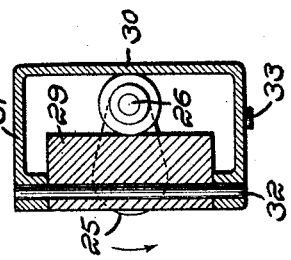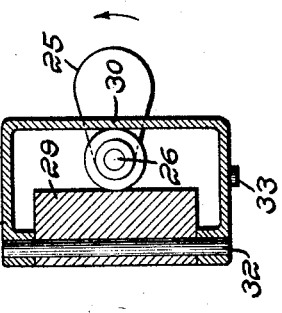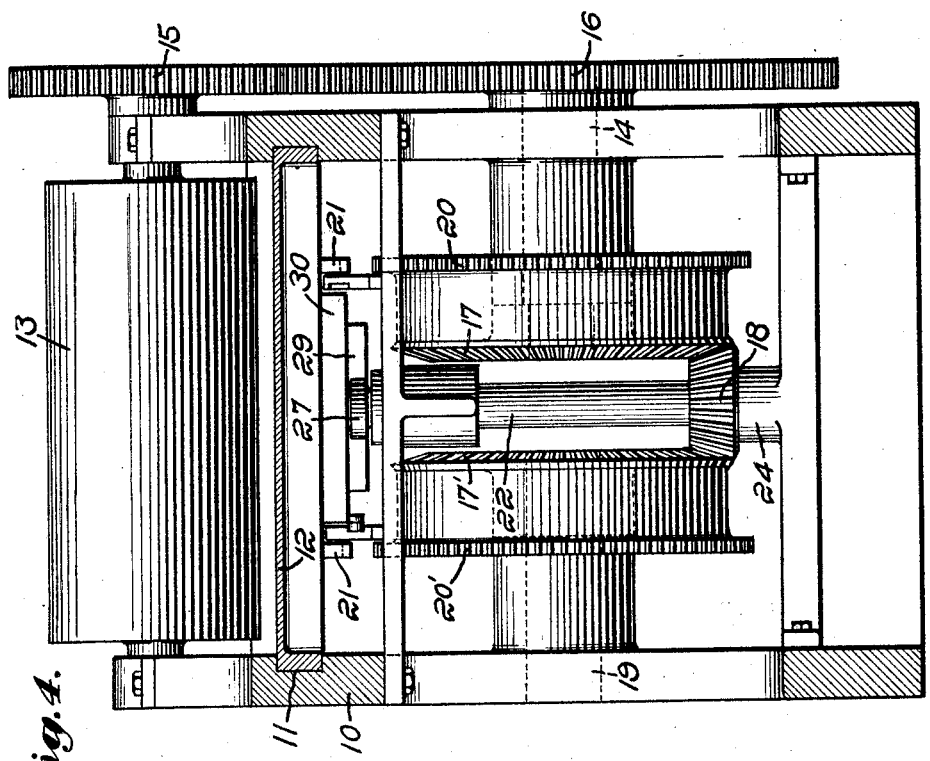

Patented July 24, 1928.

1,678,548

UNITED STATES PATENT OFFICE.

FRANK R. BELLUCHE, OF MANSFIELD, MASSACHUSETTS.

MECHANICAL MOVEMENT.

Application filed August 31, 1923. Serial No. 660,332.

This invention aims to provide an improved mechanical movement which, though susceptible of general application, is especially useful in connection with reciprocating bed presses and when used in this connection enables the reciprocating parts to be made lighter, the construction more rigid and free from lost motion and permits a higher operating speed.

The invention will be best understood by reference to the following description when taken in connection with the accompanying drawings of one specific embodiment thereof, while its scope will be more particularly pointed out in the appended claims.

In the drawings,

Fig. 1 is a plan of a printing press embodying my invention, but with the cylinder and driving gear removed;

Fig. 2 is a detail sectional view on line 2—2 of Fig. 1;

Fig. 4 is a sectional view on line 4—4 of Fig. 3; and

Figs. 5 and 6 are detail plan views illustrating the crank and gate or yoke of the bed reversing mechanism.

Figure 3:
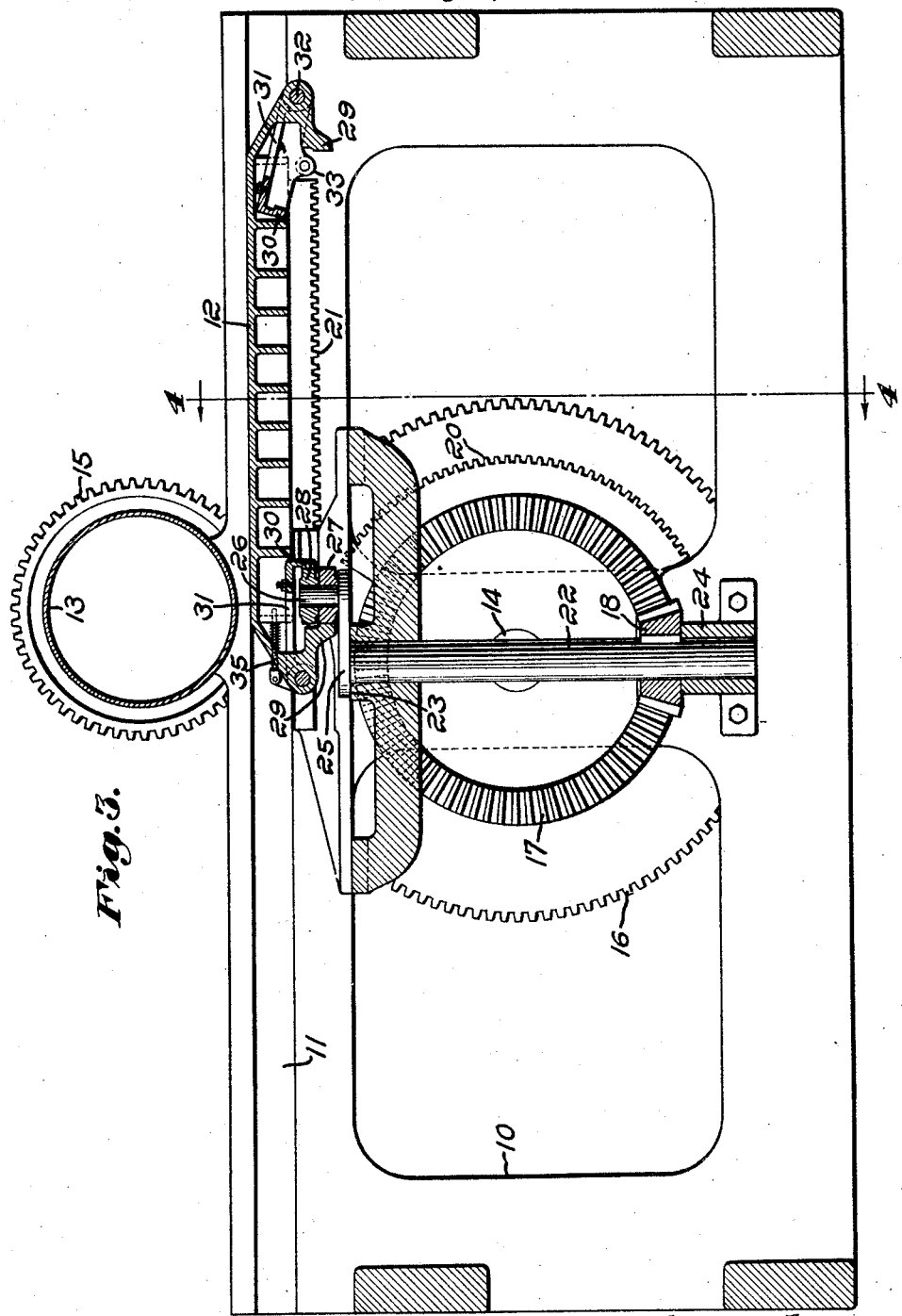
Fig. 3 is a vertical central longitudinal section on line 3—3 of Fig. 1.

Referring to the drawings and to the embodiment of the invention which is selected for exemplification, there is shown a press having a frame 10 presenting guides 11 for a sliding bed 12 which cooperates with a cylinder 13, the latter being driven at a uniform speed in one direction at two revolutions per cycle of the press. This is conveniently accomplished herein by gearing the cylinder to a bed motion shaft 14 by spur gears 15 and 16, the former secured to the cylinder and the latter to the outer end of the bed motion shaft.

The bed motion mechanism will now be described, reference being had at first to Fig. 4. Secured to the inner end of the bed motion shaft (at the left hand end thereof, as shown in Fig. 4) is a bevel gear 17 which meshes with and drives a pinion 18, the latter in turn meshing with and driving a bevel gear 17' which is thus driven in a direction opposite to that of the gear 17. The gear 17' is mounted to turn loosely on a stud 19 conveniently secured to the side frame of the machine.

Suitably formed on or secured to the bevel gears 17 and 17' are spur gear segments 20 and 20' which are adapted to mesh respectively with racks 21 and 21' carried by the under side of the bed 12.

That portion of the bed mechanism thus far described imparts to the bed the principal part of its reciprocating movement and at a uniform speed. The mechanism is characterized by rigidity, simplicity and the entire absence of lost motion or loose joints, except the slight backlash which is bound to be present in the gears. The points of application of the power to the bed by the segments are close to the bed and there is no opportunity for distortion. Moreover, the mass of the reciprocating body is made very low as compared with prior constructions. These advantages furthermore are obtained without the need of changing the mesh of gears from one to another as employed in some prior constructions. In the operation of the press as thus far described, the bed is driven in one direction by one gear segment during one-third of a cycle and in the opposite direction by the other segment one-third of a cycle.

The mechanism for slowing down the bed and reversing its direction of travel will now be described, reference being had at first to Fig. 3. The bevel pinion 18 is secured to a shaft 22 whose axis is perpendicular to the axes of the gear segments and herein is vertical. This shaft rotates in appropriate upper and lower bearings 23 and 24 and carries at its upper end a crank 25 having a crank pin 26. The crank shaft is driven three revolutions per cycle of the press.

The crank pin carries rollers 27 and 28, the former adapted to engage either of two transverse abutments 29 presented by the bed 12, while the latter roller is adapted to engage either of two abutments 30 presented by vertically swinging gates or yokes 31 which are mounted on horizontal pivots 32 on the bed.

When one of the gates is lowered (see the left hand end at the central portion of Fig. 3) the bed is locked to the crank, but when the gate is raised (see the gate at the right hand end portion of Fig. 3) the bed is unlocked from the crank. Herein the swinging of the gates is conveniently accomplished by providing each with a cam roll 33 adapted to cooperate with a fixed cam 34, one of which is shown in detail in Fig. 2, the form and arrangement of this cam being such as to operate the gates in proper relationship with the movements of the crank and bed. During one-third of a cycle, the bed is driven in one direction at the same surface speed as the cylinder by one of the segments and the associated rack. When the bed reaches the end of its uniform travel, the abutment or reverse shoe 29 at one end of the bed engages the roller 27. The segment, by which the bed has been driven, passes out of mesh with its rack at this point and the bed is then locked to the crank shaft by the lowering of the reverse gate or yoke which closes over the roller 28 under the influence of one of the cams 34. By employing suitably arranged springs 35 tending to maintain the gates elevated, it is possible to make the cams short. If perchance the spring should break, however, entrance of the cam roll into the cam track is assured by the provision of an inclined surface 36 (see Fig. 2) which elevates the cam roll to the height of the entrance.

The bed now being locked to the crank, rotation of the latter through one-half a revolution slows the bed down, brings it to a stop, reverses its travel and brings it up to speed again to a point where it is picked up by the meshing of the other gear segment with its rack, and it is then driven at a uniform speed in the opposite direction. Inasmuch as the crank shaft rotates three revolutions per cycle, the one-half revolution utilized in slowing down and reversing the direction of travel of the bed is equal to one-sixth of the cycle. The segment which next drives the bed consumes one-third of the cycle in so doing. The reverse at the opposite end uses one-sixth of the cycle and thus the cycle is completed.

The described bed motion has many advantages in addition to those previously mentioned. Another advantage is that on the printing stroke, i. e. when the bed is moving in the same direction as the cylinder the bed and cylinder are connected by but one pair of gears, viz, the gears 15 and 16 in addition to the segment and rack, whereas heretofore presses have had a larger number of wearing points between the bed and cylinder. Other presses require a segment on the cylinder and a rack on the bed which mesh at the beginning of the printing stroke, these being needed to assure proper registration, which can be secured only by correcting inaccuracies due to the large number of wearing points between the bed and the cylinder. Owing to the described construction, however, the usual segments and racks connecting the cylinder to the bed are eliminated.

Having thus described one embodiment of the invention, but without limiting myself thereto, what I claim and desire by Letters Patent to secure is:

1. In a press, the combination of a cylinder; a bed; mechanism for reciprocating said bed, including two racks carried by said bed and segments meshing with said racks, respectively, and rotated in opposite directions, respectively; gearing connecting said cylinder and said segments and affording a ratio of two revolutions of said cylinder to one revolution of each gear segment per cycle of the press, and mechanism for moving said racks lengthwise into and out of engagement with their respective segments.

2. In a press, the combination of a cylinder; a bed; mechanism for reciprocating said bed, including two racks carried by said bed and segments meshing with said racks, respectively, and rotated in opposite directions, respectively; gearing connecting said cylinder and said segments and affording a ratio of two revolutions of said cylinder to one revolution of each gear segment per cycle of the press; gearing connecting said segments; and mechanism, including a shaft driven by the second-mentioned gearing, for reversing the direction of travel of said bed.

3. In a press, the combination of a cylinder; a bed; mechanism for reciprocating said bed, including two racks carried by said bed and segments meshing with said racks, respectively, and rotated in opposite directions, respectively; gearing connecting said cylinder and said segments and affording a ratio of two revolutions of said cylinder to one revolution of each gear segment per cycle of the press; gearing, including two bevel gears and a bevel pinion meshing therewith, connecting said segments; and mechanism, including a shaft driven by said bevel pinion, for reversing the direction of travel of said bed.

4. In a press, the combination of a cylinder; a bed; mechanism for reciprocating said bed, including two racks carried by said bed and segments meshing with said racks, respectively, and rotated in opposite directions, respectively; gearing connecting said cylinder and said segments and affording a ratio of two revolutions of said cylinder to one revolution of each gear segment per cycle of the press; gearing, including two bevel gears and a bevel pinion meshing therewith, connecting said segments; and mechanism, including a crank driven by said bevel pinion and devices carried by said bed and cooperating with said crank, for reversing the direction of travel of said bed.

5. In a press, the combination of a cylinder, a reciprocatory carriage, mechanism for reciprocating said carriage, including two racks carried by said carriage, coaxial segments meshing with said racks, respectively, mechanism for driving said segments in opposite directions, respectively, thereby to drive said carriage first in one direction and then in the opposite direction, mechanism for reversing the direction of travel of said carriage and mechanism for causing correlation of the movement of said cylinder and carriage.

6. In a press, the combination of a cylinder, a reciprocatory carriage, gearing including two gears rotating in opposite directions to drive said carriage in opposite directions, a gear constantly meshing with said two gears to drive them, and mechanism for causing correlation of the movement of said cylinder and carriage.

7. In a press, the combination of a cylinder, a reciprocable carriage, mechanism for moving said carriage in opposite directions, respectively, at a uniform speed, said mechanism including two racks carried by said carriage, two segments adapted to mesh with said racks, respectively, mechanism for reversing the direction of travel of said carriage at opposite ends of its movement under the influence of the first-mentioned mechanism, the second-mentioned mechanism including a shaft perpendicular to the axes of said segments, and mechanism for causing correlation of the movement of said cylinder and carriage.

8. In a press, the combination of a cylinder, a horizontally reciprocatory carriage, mechanism for imparting to said carriage the principal part of its movement in one direction; mechanism for imparting to said carriage the principal part of its movement in the opposite direction, mechanism, including a shaft between the first and second-mentioned mechanisms, for reversing the direction of travel of said carriage, and mechanism for causing correlation of the movement of said cylinder and carriage.

9. In a press, the combination of a cylinder, a carriage, mechanism including two racks and two gear segments meshing therewith for moving said carriage in opposite directions, respectively; mechanism, including a shaft perpendicular to the axes of said gear segments, for reversing the direction of travel of said carriage and mechanism for causing correlation of the movement of said cylinder and carriage.

10. In a press, the combination of a cylinder, a horizontally reciprocatory carriage, mechanism for imparting to said carriage the principal part of its reciprocatory movement; mechanism beneath said carriage including a crank rotating about a vertical axis and means carried by the under side of said carriage and cooperating with said crank for reversing the direction of travel of said carriage, and mechanism for causing correlation of the movement of said cylinder and carriage.

11. In a press, the combination of a cylinder; a bed; mechanism for reciprocating said bed, including two racks carried by said bed and segments meshing with said racks, respectively, and rotated in opposite directions, respectively; gearing connecting said cylinder and said segments and affording a ratio of two revolutions of said cylinder to one revolution of each gear segment per cycle of the press; and mechanism for reversing the direction of travel of said bed.

12. In a press, the combination of a cylinder; a bed; mechanism for reciprocating said bed, including two racks carried by said bed and both having downwardly directed teeth, and segments both being below and meshing with said racks, respectively, and rotated in opposite directions, respectively; and gearing connecting said cylinder and said segments and affording a ratio of two revolutions of said cylinder to one revolution of each gear segment per cycle of the press.

13. In a press, the combination of a cylinder; a bed; mechanism for reciprocating said bed, including two racks carried by said bed and segments meshing with said racks, respectively, and rotated in opposite directions, respectively, gearing connecting said cylinder and segments to cause said bed to be driven in one direction by one gear segment during one third of a cycle of the press and in the opposite direction by the other segment during one third of a cycle; and mechanism for reversing the direction of travel of said bed at each end of its travel during one sixth of a cycle of the press.

In testimony whereof, I have signed my name to this specification.

FRANK R. BELLUCHE.